Figure 1:
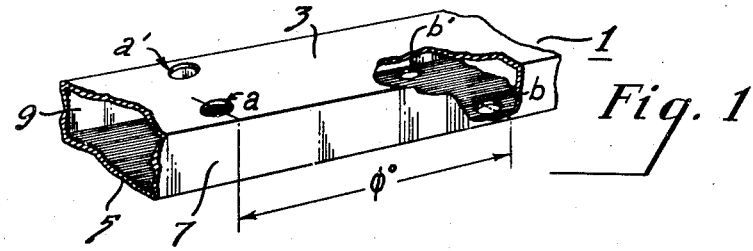

July 20, 1948.  J. R. FORD  2,445,348
REFLECTOMETER FOR WAVEGUIDE SYSTEMS
Filed Dec. 21, 1945

INVENTOR.
John R. Ford
BY
ATTORNEY

Patented July 20, 1948

2,445,348

UNITED STATES PATENT OFFICE 2,445,348

REFLECTOMETER FOR WAVE GUIDE SYSTEMS

John R. Ford, Narberth, Pa., assignor to Radio Corporation of America, a corporation of Delaware Application December 21, 1945, Serial No. 636,532

6 Claims. (Cl. 171—95)

The invention relates generally to microwave transmission and measurement systems, and more particularly to substantially aperiodic reflectometers for measuring the magnitude of reflected waves over a wide frequency range on a waveguide transmission system.

The most useful measurements customarily made on transmission lines or waveguides are the measurement of standing-wave-ratio and reflection coefficient. The same information obtainable from standing-wave-ratio measurements may be obtained by measuring separately the forward- and backward-travelling wave magnitudes. Ordinarily measurements of the standing-wave-ratio require the use of a movable probe in order to determine the wave magnitude at various predetermined points along the transmission line. Movable elements in ultra-high-frequency coaxial transmission lines and waveguides involve difficulties due to imperfect electrical contact between the transmission line and the movable probe element which may introduce considerable error in the standing-wave-ratio measurements. Furthermore, standing-wave-ratio or reflection-coefficient measurements heretofore have necessitated a series of at least two consecutive measurements of wave magnitude at different points along the transmission line.

Attempts to measure separately the magnitudes of the forward- and backward-travelling waves without the necessity of a probe element have been limited to measurements at a single frequency or to apparatus wherein the transmitted energy is continuously coupled to the measuring apparatus over distances comparable to one-half, or preferably several wavelengths at the operating frequency.

In the copending U. S. application of Nathaniel I. Korman, Serial No. 528,655, filed March 29, 1944, now Patent No. 2,423,390, issued July 1, 1947, separate measurements of the magnitudes of forward- and backward-travelling waves in a transmission line or waveguide are obtainable without the limitation of frequency selectivity in the measuring apparatus. Said copending application disclosed a system which contemplates the use of two separate, lumped, wave-pickup and measuring devices, each polarized to detect and indicate the magnitudes of waves travelling in different directions along the transmission line. The system provides accurate standing-wave-ratio measurements over a relatively wide frequency band and employs two wave-pickup coupling means of opposite sense for detecting separately the forward- and backward-travelling waves. Either inductive or capacitive coupling probes of opposite sign may be utilized.

The instant invention contemplates an improvement upon the system disclosed and claimed in said copending application in that measurements of the reflection-coefficient over a wide frequency range may be accomplished without the necessity of employing coupling probes of opposite sense between the main transmission waveguide and the reflectometer waveguide. Briefly, the novel structure and method proposed herein comprises the use of a pair of reentrant waveguide reflectometer sections supported by the main transmission waveguide.

The reentrant reflectometer waveguides are closed at each end, and each include a wave detector and a matching termination adjacent to the closed ends. Each of the reflectometer waveguides are coupled to the main transmission waveguide through two apertures in the main waveguide located adjacent to the edges of opposite wide faces of said main waveguide, whereby waves propagated through the main waveguide are coupled to the reflectometer waveguides in opposite phase. The apertures in the main waveguide should be substantially identical in size and in displacement from the edge of the wide waveguide faces, and may have random spacing in the direction of wave propagation.

The matched termination may include a tapered plug of lossy material substantially conforming to the inner boundaries of the reentrant reflectometer waveguides. The wave detector disposed in each of the reflectometer waveguides may comprise a microwave crystal detector of the tungsten-silicon type generally disclosed in the copending application of Wendell L. Carlson Serial No. 507,755, filed October 26, 1943, now Patent No. 2,427,087, issued September 9, 1947, and assigned to applicant's assignee.

Wave transmission propagated through the main waveguide may be considered to comprise a forward wave having a magnitude F and a backward wave having a magnitude B. The forward-travelling wave couples into each of the reflectometer waveguides through the apertures in the main waveguide walls which open into each of the reflectometer waveguides. The forward-travelling waves coupled into each reflectometer waveguide produce four travelling waves therein. Two of these induced travelling waves established within the reflectometer waveguide may be considered to have magnitudes $W_{Fa'}$ and $W_{Fb'}$, which travel in a forward direction and are induced by the coupling through the apertures $a'$ and $b'$ in the main waveguide. Also two travelling waves are induced through the apertures $a'$ and $b'$ within the reflectometer waveguide which may be considered to have magnitudes $W'_{Fa'}$ and $W'_{Fb'}$ travelling in a backward direction along the reflectometer waveguide.

The backward travelling waves $W'_{Fa'}$ and $W'_{Fb'}$ travelling in a backward direction within the reflectometer waveguide are absorbed without reflection by the tapered resistive termination adjacent to the generator end of the reflectometer waveguide. Hence, since the forward-travelling waves in the reflectometer waveguide, $$W_{Fa'} = -W_{Fb'}$$

are of opposite phase due to coupling through opposite waveguide walls, the wave detector which is located adjacent to the load end of the reflectometer waveguide is not excited by any of these induced waves.

Similarly, the backward-travelling waves in the main transmission waveguide induce four travelling waves within the reflectometer waveguide. These may be considered to have magnitudes $W_{Ba}$ and $W_{Bb}$ travelling in a forward direction in the reflectometer waveguide and $W'_{Ba'}$ and $W'_{Bb'}$ travelling in a backward direction in the reflectometer waveguide. Thus the tapered absorptive termination in the reflectometer waveguide absorbs the backward-travelling waves $W'_{Ba'}$ and $W'_{Bb'}$ induced in the reflectometer waveguide by the backward-travelling waves in the main waveguide. However, the reflectometer detector will be responsive to the forward-travelling waves $W_{Ba'}$ and $W_{Bb'}$ induced in the reflectometer waveguide by the backward-travelling waves in the main waveguide. The reflectometer detector, therefore, will be excited by the resultant of all of the backward-travelling waves in the main waveguide except for waves of a frequency wherein the spacing of the apertures $a'$ and $b'$ is an integral number of half wavelengths. Hence, if the spacing $\phi$ is unequal to $n\lambda/2$, the reflectometer detector excitation will be proportional substantially only to the magnitude of the backward-travelling wave B in the main transmission waveguide. This condition obtains since at the detector the forward-travelling waves $W_{Fa'}$ and $W_{Fb'}$ are induced in opposite phase in the reflectometer waveguide in response to the forward-travelling waves F propagated through the main waveguide due to the opposing coupling through the main waveguide apertures $a'$ and $b'$.

A second reflectometer waveguide, having an absorptive termination at the load end and a wave detector at the generator end, and coupled to the main waveguide through apertures adjacent to the opposite edge of the wide faces thereof, will provide a detector output proportional in magnitude only to the magnitude of the forward-travelling wave F in the main waveguide. The output signals proportional to the magnitudes of the forward- and backward-travelling waves F and B in the main waveguide may be combined in the ratio B/F to provide in any desired manner an indication of the absolute value of the reflection coefficient in the main waveguide. This indication will be reliable for all frequencies within the transmission limits of the main waveguide except wherein the transmitted wavelength bears an integral relation with the spacing of the coupling apertures between the main waveguide and the reflectometer waveguides.

Among the objects of the invention are to provide an improved method of and means for measuring wave energy in a waveguide transmission system. Another object of the invention is to provide an improved method of and means for measuring the reflection-coefficient over a wide frequency range for waves propagated through a waveguide transmission system. A further object of the invention is to provide an improved reflectometer for measuring separately the magnitudes of the forward- and/or backward-travelling waves in a waveguide transmission system. An additional object is to provide an improved reflectometer for a waveguide transmission system wherein coupling probes are eliminated. A further object is to provide an improved reflectometer for a waveguide transmission system wherein oppositely-phased coupling is provided to a reflectometer waveguide by means of apertures in the opposite wide faces of the transmission waveguide opening into the reflectometer waveguide. A still further object of the invention is to provide an improved reflectometer for a waveguide transmission system providing minimum loading of the main wave transmission system. Another object of the invention is to provide a readily demountable reflectometer for a waveguide transmission system. An additional object is to provide an improved reflectometer system for a waveguide transmission system wherein the only alteration to conventional rectangular transmission waveguide systems is the provision of small coupling apertures adjacent to the edges of opposite wide faces of said waveguide system.

Figure 2:
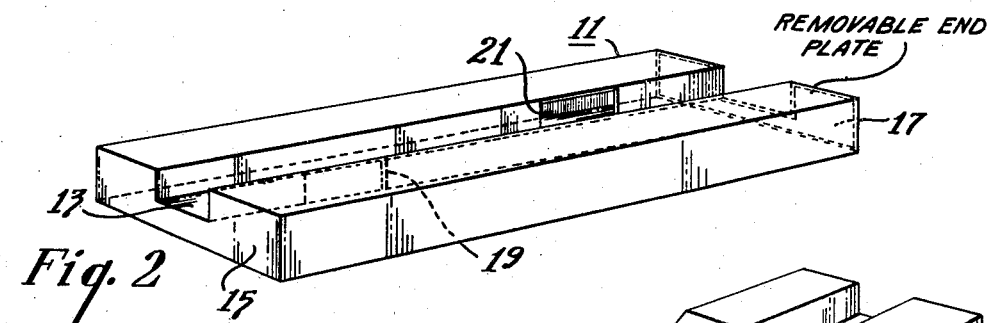
Figure 3:
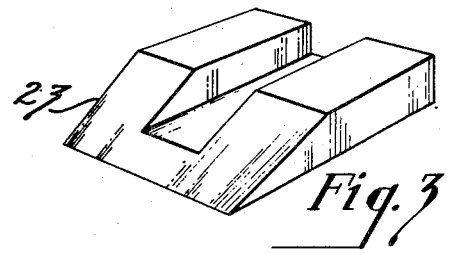
Figure 5:
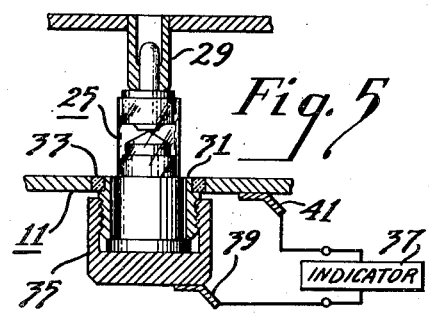
Figure 4:
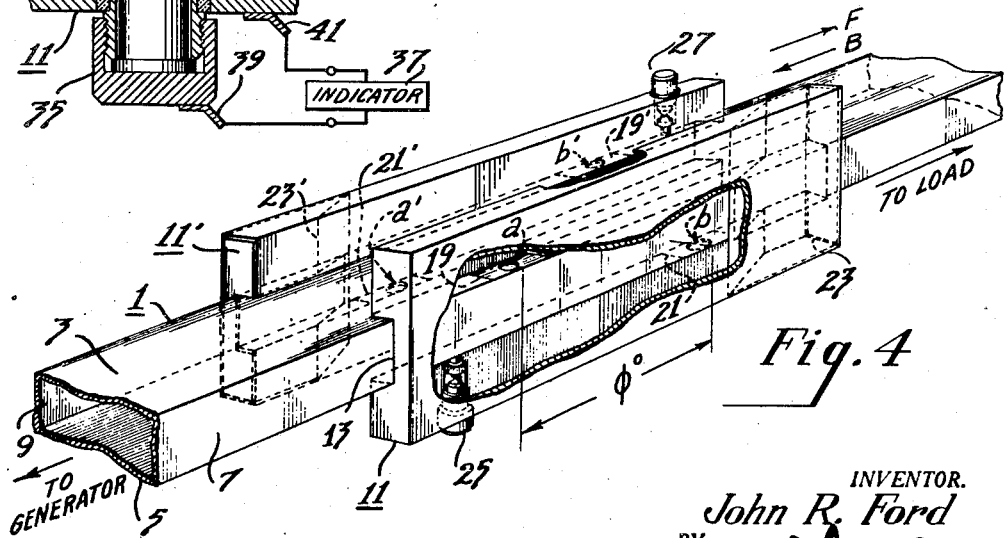

The invention will be described in further detail by reference to the accompanying drawing of which Figure 1 is a perspective fragmentary view of a conventional rectangular waveguide including coupling apertures adjacent to the edges of opposite wide faces thereof; Figure 2 is a perspective view of a reentrant reflectometer waveguide section according to the invention; Figure 3 is a perspective view of a reentrant tapered terminating element for said reflectometer waveguide section; Figure 4 is a perspective assembly view of a main transmission waveguide coupled according to the invention to a pair of reentrant reflectometer waveguide sections each including a tapered termination and a microwave crystal detector; and Figure 5 is an enlarged elevational cross-sectional view of a portion of said reflectometer waveguide including a microwave crystal detector. Similar reference characters are applied to similar elements throughout the drawing.

Referring to the drawing, Figure 1 shows a section of rectangular waveguide 1 which may be connected between a source of microwaves and a load, not shown, wherein small apertures $a$ and $b$ are cut into the opposite wide faces 3, 5 of the waveguide adjacent to one of the narrow side faces 7 thereof. The longitudinal spacing of the apertures $a$ and $b$ is limited only by the fact that it should be unequal to an integral number of half-wavelengths at the operating frequency. Similarly other apertures $a'$ and $b'$ are located, respectively, in the wide waveguide faces 3 and 5 adjacent to the other narrow waveguide side face 9. The second group of apertures $a'$, $b'$ also may be spaced longitudinally along the waveguide at any desired distance which is not an integral number of half-wavelengths at the operating microwave frequency.

Figure 2 shows one of the reentrant reflectometer waveguide sections 11 having a reentrant portion 13 and closed end portions 15, 17. The reentrant portion 13 includes apertures 19, 21 spaced to coincide with and overlap the apertures $a$ and $b$, respectively, in the rectangular transmission waveguide 1. The reentrant reflectometer waveguide may be supported in any desired manner in telescopic relation with the narrow side face 7 of the transmission waveguide 1.

Figure 3 shows a typical tapered reentrant lossy dielectric terminating element 23 which is inserted within one end of the reentrant reflectometer waveguide section by removing the end plate 17.

Figure 4 shows the assembly of the rectangular transmission waveguide 1 with two reentrant reflectometer waveguide sections 11 and 11', showing the telescopic relation of the main waveguide and the reentrant reflectometer waveguides and the juxtaposed positions of the apertures $a$, $b$, $a'$, $b'$ of the main waveguide and the apertures 19, 21, 19' and 21', respectively, of the reentrant portions of the reflectometer waveguide sections. Primed reference characters are applied to elements of the second reflectometer waveguide 11' which corresponds to similar elements in the first reflectometer waveguide 11.

The tapered lossy dielectric terminating element 23 is disposed within the first reflectometer waveguide section 11 at its end remote from the microwave generator. Similarly a second tapered lossy dielectric terminating element 23' is located in the second reflectometer waveguide section 11' at its end adjacent to the microwave generator.

A first microwave crystal detector 25 is located in the lower portion of the first reflectometer waveguide section at its end closest to the generator. A second microwave crystal detector 27 is located in the upper portion of the second reflectometer waveguide section 11' adjacent to the end thereof remote from the microwave generator. Thus, the second crystal detector 27 is excited by forward-traveling waves induced by backward-traveling waves in the main transmission waveguide 1, and the first crystal detector 25 is excited only by backward-traveling waves induced by forward-travelling waves propagated along the main transmission waveguide 1, as explained heretofore.

Figure 5 is an enlarged view of a typical microwave crystal detector of the tungsten–silicon type generally described in the copending U. S. application of Wendell L. Carlson identified heretofore. The crystal detector 25 engages a spring contact 29 supported by the reentrant wall of the reflectometer waveguide 11. An externally threaded metal bushing 31 insulated from the lower wall of the reflectometer waveguide 11 by means of an insulating bushing 33 engages the remaining contact of the crystal detector. The crystal detector is retained in position within the waveguide by means of a threaded metal cap 35 screwed to the externally threaded metal bushing 31. Connections to a suitable indicator 37, or other utilization device, are provided by contacts 39, 41 connected, respectively, to the cap 35 and the lower wall of the reflectometer waveguide 11. The indicator may include amplification to provide the desired sensitivity, or it may comprise a suitably sensitive direct current meter or other signal indicating device.

Thus the invention disclosed comprises an improved reflectometer for measuring travelling waves over a wide frequency range on a waveguide transmission line wherein the main transmission waveguide is coupled into separate reentrant reflectometer waveguide sections each including a matched termination and a waveguide detector to provide separate indications of the magnitudes of the forward- and backward-travelling waves, whereby the reflection-coefficient or standing-wave-ratio may be determined as a function of said travelling wave indications.

I claim as my invention:

1. A reflectometer for measuring travelling waves over a wide frequency range on a waveguide transmission line including a main waveguide having apertures therein at points of opposite potential longitudinally spaced along said waveguide, a second waveguide telescoped transversely with an opening into said first waveguide through said apertures, a substantially reflectionless matched termination coupled to one end of said second waveguide, a wave detector coupled into the remaining end of said second waveguide, and means responsive to said detector for indicating the magnitude of waves travelling in a predetermined direction along said main waveguide.

2. A reflectometer for measuring travelling waves over a wide frequency range on a waveguide transmission line including a main waveguide having at least two apertures therein at points of opposite potential longitudinally spaced along and on opposite walls of said waveguide, a second waveguide telescoped transversely with and opening into said first waveguide through said apertures, a substantially reflectionless matched termination coupled to one end of said second waveguide, a wave detector coupled into the remaining end of said second waveguide, and means responsive to said detector for indicating the magnitude of waves travelling in a predetermined direction along said main waveguide.

3. A reflectometer for measuring travelling waves over a wide frequency range on a waveguide transmission line including a main waveguide having at least two apertures therein at points of opposite potential longitudinally spaced along and on opposite walls of said waveguide, a source of microwave energy and a load device connected to opposite ends of said main waveguide, a second waveguide telescoped transversely with and opening into said first waveguide through said apertures, a substantially reflectionless matched termination coupled to one end of said second waveguide, a wave detector coupled into the remaining end of said second waveguide, and means responsive to said detector for indicating the magnitude of waves travelling in a predetermined direction along said main waveguide.

4. Apparatus according to claim 3 including a third waveguide telescoped transversely with and opening into said main waveguide through others of said apertures, a second matched termination coupled to one end of said third waveguide, a second wave detector coupled into the remaining end of said third waveguide, and means responsive to said second detector for indicating the magnitude of waves travelling in the opposite to said predetermined direction along said main waveguide.

5. A reflectometer for measuring travelling waves over a wide frequency range on a waveguide transmission line including a main waveguide having a plurality of apertures therein at points of opposite potential longitudinally spaced along opposite edges of opposite walls of said waveguide, second and third waveguides each telescoped transversely with and opening through apertures in opposite walls and opposite wall edges into said first waveguide, substantially reflectionless matched terminations coupled to opposite ends of said second and said third waveguides, wave detectors coupled into the remaining opposite ends of said second and said third waveguides, and means responsive to said detectors for indicating the magnitude of waves travelling in opposite directions along said main waveguide.

6. A reflectometer for measuring travelling waves over a wide frequency range on a waveguide transmission line including a main waveguide having a plurality of apertures therein at points of opposite potential longitudinally spaced along and on opposite walls of said waveguide, a second waveguide having a reentrant portion telescoped transversely with an opening into said first waveguide through said apertures, a tapered substantially reflectionless matched termination having a portion conforming to the inner cavity of said second waveguide and disposed within one end of said second waveguide, a wave detector coupled into the remaining end of said second waveguide, and means responsive to said detector for indicating the magnitude of waves travelling in a predetermined direction along said main waveguide.

JOHN R. FORD.

REFERENCES CITED

The following references are of record in the file of this patent:

UNITED STATES PATENTS

| Number | Name | Date |
| --- | --- | --- |
| 2,106,713 | Bowen | Feb. 1, 1938 |
| 2,191,271 | Carter | Feb. 20, 1940 |
| 2,375,223 | Hansen | May 8, 1945 |
| 2,403,289 | Korman | July 2, 1946 |

FOREIGN PATENTS

| Number | Country | Date |
| --- | --- | --- |
| 545,936 | Great Britain | June 18, 1942 |